US009978196B2

(12) United States Patent
Ashby et al.

(10) Patent No.: US 9,978,196 B2
(45) Date of Patent: *May 22, 2018

(54) BANKNOTE ACCEPTOR WITH VISUAL CHECKING

(75) Inventors: John Ashby, Lancashire (GB); Andrew William Barson, Cheshire (GB); Malcolm Bell, Leeds (GB); Les Hutton, Rochdale (GB); Kevin Mulvey, Warrington (GB)

(73) Assignee: Crane Payment Innovations Limited, Lancashire (GB)

( * ) Notice: Subject to any disclaimer, the term of this patent is extended or adjusted under 35 U.S.C. 154(b) by 994 days.

This patent is subject to a terminal disclaimer.

(21) Appl. No.: 13/534,656

(22) Filed: Jun. 27, 2012

(65) Prior Publication Data

US 2012/0263370 A1    Oct. 18, 2012

Related U.S. Application Data

(63) Continuation of application No. 12/294,769, filed as application No. PCT/EP2007/051481 on Feb. 15, 2007, now Pat. No. 8,232,867.

(30) Foreign Application Priority Data

Mar. 20, 2006  (GB) .................... 0605569.3

(51) Int. Cl.
G05B 19/00 (2006.01)
G07D 7/128 (2016.01)
G06Q 20/36 (2012.01)
G07D 7/12 (2016.01)

(52) U.S. Cl.
CPC ......... *G07D 7/128* (2013.01); *G06Q 20/3674* (2013.01); *G07D 7/12* (2013.01)

(58) Field of Classification Search
None
See application file for complete search history.

(56) References Cited

U.S. PATENT DOCUMENTS

| 4,811,408 | A  | 3/1989 | Goldman |
| 5,095,365 | A  | 3/1992 | Takatoo et al. |
| 6,883,706 | B2 | 4/2005 | Mastie et al. |
| 7,095,880 | B2 | 8/2006 | Martinez et al. |

(Continued)

FOREIGN PATENT DOCUMENTS

EP    1246139 A    10/2002

*Primary Examiner* — George Bugg
*Assistant Examiner* — Renee Dorsey
(74) *Attorney, Agent, or Firm* — Orrick, Herrington & Sutcliffe LLP; Joseph A. Calvaruso

(57) ABSTRACT

A banknote acceptor 1 for authenticating a banknote 2, has a sensing station S with detector 18 that produces image signals corresponding to a face the banknote. A processor 24 pre-processes the image signals and compares them with stored reference data corresponding to an acceptable banknote from memory 25 to determining the authenticity of the banknote and its denomination. A display device 29 displays an image 31 corresponding to the banknote under test based on the image signals from the detector 18, to allow the user to perform a visual check that the banknote detected at the sensing station corresponds to the banknote under test presented by the user. Also, the detected denomination of the banknote is displayed on device 32. The user can accept or reject the banknote using buttons 33 and 34, and retrieve images of previously accepted banknotes with button 35.

27 Claims, 4 Drawing Sheets

(56) References Cited

U.S. PATENT DOCUMENTS

| | | |
|---|---|---|
| 7,138,905 B2 | 11/2006 | Pavlidis et al. |
| 7,278,527 B2 | 10/2007 | Daout et al. |
| 7,635,082 B2 | 12/2009 | Jones |
| 7,804,984 B2 | 9/2010 | Sidlauskas et al. |
| 2002/0162775 A1 | 11/2002 | Saltsov et al. |
| 2004/0213448 A1 | 10/2004 | Jou et al. |
| 2004/0252025 A1 | 12/2004 | Silverbrook et al. |
| 2004/0256196 A1 | 12/2004 | Yu et al. |
| 2005/0040225 A1 | 2/2005 | Csulits et al. |
| 2005/0212658 A1 | 9/2005 | Kinsella |
| 2005/0256807 A1 | 11/2005 | Brewington |
| 2006/0078170 A1 | 4/2006 | Kamata et al. |
| 2006/0289628 A1 | 12/2006 | Gunst et al. |
| 2007/0003112 A1 | 1/2007 | Awatsu et al. |
| 2007/0041620 A1 | 2/2007 | Ito |
| 2010/0045423 A1 | 2/2010 | Glickman et al. |

BANKNOTE ACCEPTOR WITH VISUAL CHECKING

CROSS REFERENCE TO RELATED APPLICATION

The present application is a continuation of U.S. patent application Ser. No. 12/294,769, entitled Banknote Acceptor With Visual Checking filed on Feb. 6, 2009, that claims priority to PCT/EP2007/051481 filed Feb. 15, 2007, and that claims priority to Great Britain Application No. GB 0605569.3 filed Mar. 20, 2006. Each of these applications is hereby incorporated in their entirety by reference.

FIELD OF THE INVENTION

This invention relates to a banknote acceptor for authenticating a banknote under test.

BACKGROUND OF THE INVENTION

Conventional banknote acceptors authenticate a banknote under test by checking its physical properties against stored reference data and signalling the authenticity of the banknote depending on the outcome of the comparison. The banknote under test may be scanned optically to produce digital image data corresponding to one or both sides of the banknote. The image data is compared with stored reference data corresponding to acceptable banknotes to authenticate the banknote under test. Also, the denomination of the banknote can be determined so that credit corresponding to the monetary value of the banknote can be allocated. Banknote acceptors have been used hitherto in gaming and vending machines to provide credit for gaming or making purchases.

A problem with conventional banknote acceptors is that the user may dispute the outcome of the authentication process and may dispute the monetary value of the credit allocated to the banknote under test.

For example, the user may contend that a higher value banknote was presented to the banknote acceptor than the monetary credit allocated. Such a dispute can be time consuming to resolve and may require a machine operator to open the machine in which the banknote acceptor is installed to retrieve the banknote and physically examine it.

SUMMARY OF THE INVENTION

According to the invention there is provided a banknote acceptor for authenticating a banknote under test presented thereto by a user, comprising: a sensing station to receive the banknote under test, including a detector to provide image signals corresponding to the banknote, a processor to make a comparison of image data corresponding to at least some of the image signals from the detector, with stored reference data corresponding to an acceptable banknote, for determining the authenticity of the banknote under test, and to provide an acceptance signal for the banknote under test in dependence on the outcome of the comparison, and a display device operable to display image signals for the banknote under test, such as to allow the user to perform a visual check that the banknote detected at the sensing station corresponds to the banknote under test presented thereto by the user.

Thus, by providing a display of the authenticated banknote, the user may visually check that the banknote image corresponds to the banknote presented to the banknote acceptor for authentication.

The banknote acceptor according to the invention has particular application to banknote freed machines such as vending and gambling machines, and can also be used in point of sale devices.

The invention also includes a method of authenticating a banknote under test presented by a user, comprising: providing image signals corresponding to the banknote, comparing image data corresponding to at least some of the image signals, with stored reference data corresponding to an acceptable banknote, to determine the authenticity of the banknote under test, and to provide an acceptance signal for the banknote under test in dependence on the outcome of the comparison, and displaying image signals for the banknote under test, such as to allow the user to perform a visual check that the banknote detected at the sensing station corresponds to the banknote under test presented thereto by the user.

BRIEF DESCRIPTION OF THE DRAWINGS

In order that the invention may be more fully understood an embodiment thereof will now be described by way of example with reference to the accompanying drawings in which.

DETAILED DESCRIPTION OF EMBODIMENTS OF THE INVENTION

As used herein the term "banknote" means a promissory note especially from a central bank or other governmental organisation payable to the bearer on demand for use as money, also known as "paper money" and in the USA as "currency" or a "bill", and also includes other sheet objects with an attributable monetary value, such as tokens and vouchers.

Figure 1:
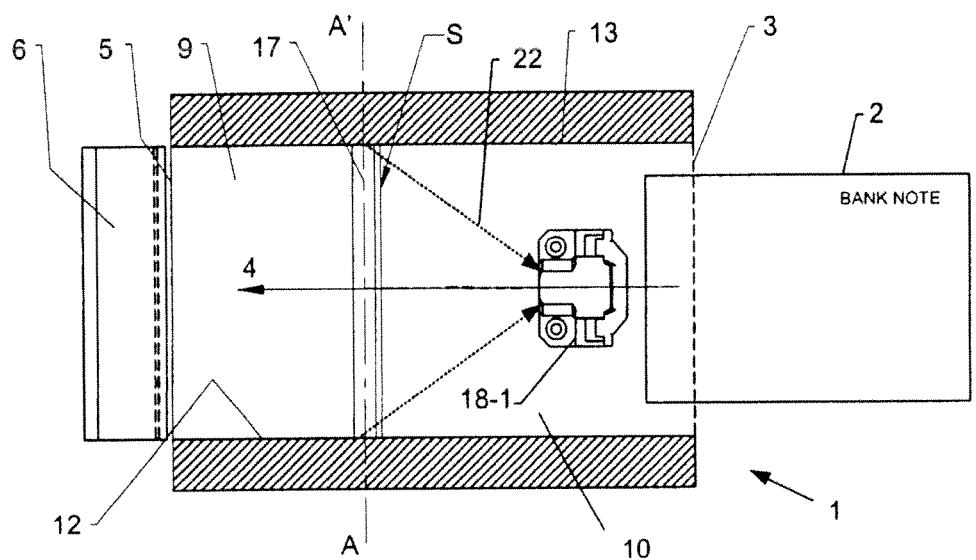
FIG. 1 is a schematic plan view of a banknote acceptor device according to the invention.
Figure 2:
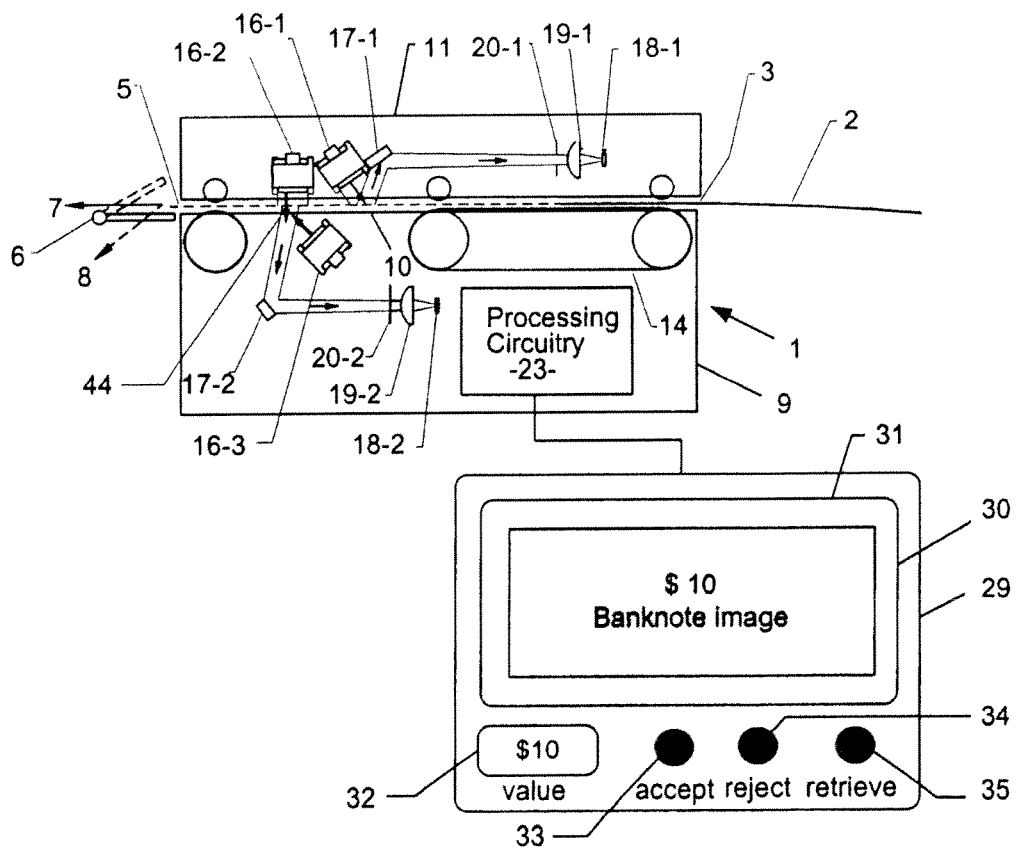
FIG. 2 is a schematic sectional view of the device shown in FIG. 1.

Referring to FIGS. 1 and 2, a banknote acceptor 1 receives a banknote 2 through an inlet 3 wider than the banknote, such that the banknote passes along a path 4 shown in dotted outline to an outlet 5 through a sensing station S where image data corresponding to the banknote is captured to determine its authenticity. A solenoid operated gate 6 is disposed at the outlet 5 to direct acceptable banknotes along an acceptance path shown by arrow 7, or to rotate to a position shown in dotted outline to direct unacceptable banknotes along reject path 8 shown in dotted outline.

Alternatively, an unacceptable banknote can be rejected by reversing it back through the inlet 3, as described in more detail below.

As shown in FIG. 2, the path 4 for the banknote is defined between a main body 9 having a platen 10, overlaid by a spaced upper part 11. As shown in FIG. 1, the platen 10 is formed with upstanding regions 12, 13 that define side edges of the path 4. The banknote 2 is driven along the path 4 by means of a belt and pulley arrangement 14 and a roller 15 driven by electric motors (not shown).

The banknote 2 under test can be illuminated with optical radiation in three different ways at the sensing station S to test its reflective properties on each side and also its transmissive properties. To test reflection from the upper surface of the banknote 2, a light source 16-1 extends transversely across the platen 10 and directs optical radiation downwardly in a flat beam across the entire width of the platen 10. One example of the source 16-1 is an array of surface mounted LEDs arranged in closely packed rows, to emit optical radiation of different wavelengths, in a light box covered by a diffusing sheet to provide spatially uniform illumination over a broad optical band. The optical radiation may be visible or non-visible radiation such as ultra violet or infra-red. A light emitting polymer sheet or other light sources can be used as an alternative to the light box. The optical radiation from source 16-1 is reflected by the banknote 2 towards planar mirror 17-1, which directs the reflected radiation towards a sensor 18-1. The sensor 18-1 in this example comprises a TAOS device with a row of 120 pixel CCD sensors. In use, only a portion of the row of pixels is used in order to accommodate variances in alignment that occur during manufacture, and for example only a successive run 102 of the 120 pixels may be utilised for signal processing when detecting banknotes. A lens arrangement comprising converging lens 19-1 and associated stop 20-1 directs light from the mirror 17-1 onto the sensor 18-1. The lens arrangement may be telecentric although other lens configurations can be used. An advantage of a telecentric arrangement is that it provides an image of fixed size regardless of variation in distance of the banknote 2 from the lens 20-1 in the region of the sensing station S. The image focus quality will change slightly with variations in distance to the banknote, but the image will not change in size. The use of a small aperture for the stop 20-1 increases the depth of field and so makes focus errors of less significance. The lens system can be configured so that despite movement of the banknote relative to imaging system and assembly errors in the building of the apparatus, the image size will always cover the same number of pixels on the CCD sensor array 18-1.

In order to test the transmission properties of the banknote, a second light source 16-2 extends across the width of the platen 10 and directs optical radiation downwardly through a transparent window 21 towards mirror 17-2 where it is reflected through lens 19-2 with an associated stop 20-2, to a second CCD sensor array 18-2.

The reflective properties of the underside of the banknote are tested using a third optical source 16-3 that directs optical radiation into region of the window 21, to be reflected by the banknote 2 towards mirror 17-2 and then to sensor 18-2 lens and stop arrangement 19-2, 20-2.

The banknote thus can be analysed in terms of its optically reflective properties on both sides, and also in terms of its transmissive properties. Appropriate data can be gathered by selective use of the light sources 16-1, 2, 3, so as to provide sampling data to processing circuitry 21 shown in FIGS. 2 and 3. The banknote can be accepted or rejected in the manner described hereinafter, by using the gate 6 to direct acceptable banknotes along accept path 7 and rejected banknotes along reject path 8. Alternatively, the belt and pulley arrangement 15 can be driven in reverse to reject the banknote 2 through the inlet 3 after it has been fed in its entirety from the inlet 3 through the sensing station S.

When the banknote 1 is initially inserted into the inlet 2, the drive belt and pulley arrangement 14 progressively moves the banknote through the sensing station S so that successive rows of pixel data are developed by the detectors 18 over the entire surface region of the banknote. In this example, it is assumed that the rows of pixelated data are derived from the use of optical source 16-1 and associated CCD detector 18-1 although the ensuing description applies equally well to data developed at sensor 18-2 in response to optical radiation from light sources 16-2 or 16-3.

The sensor array 18-1 comprises a CMOS chip. The individual pixels of the array are closely spaced on the chip 18 and the lens 19-1 ensures that each pixel is responsive to respective sampling location disposed along the line A-A', across path 4, as illustrated by dotted lines 22 in FIG. 1.

Processing circuitry 23 for controlling operation of the device may be mounted in the main body 9. The processing circuitry 23 is shown in block diagrammatic form in FIG. 3 and comprises a micro controller 24 that receives digital samples from the pixelated photo sensors in chip 18. It will be understood that digital samples can be received from either of the chips 18-1, 2 and only one is shown to simplify the explanation. The data samples are compared with corresponding samples for acceptable banknotes stored in memory 25. As explained in more detail later, the successive rows of data samples may be pre-processed and stored in the memory 25 so that an image of the face of the banknote under test can be displayed to the user for authentication purposes.

Operation of the belt and pulley arrangement 14 shown in FIG. 2 is controlled by the micro controller 24 through a driver circuit 26. The gate 6 is driven by driver circuit 27 so that acceptable banknotes are allowed to pass along path 7 and non-acceptable banknotes are passed along path 8 as illustrated in FIG. 2. Alternatively, rejected banknotes can be reversed out of the inlet 3 by the microcontroller 24 instructing the driver 27 to reverse the belt and pulley arrangement 14 and roller 15.

The light sources 16-1, 2, 3 (shown collectively in FIG. 3 as light source 16) are operated individually under the control of the microcontroller 24 through a driver circuit 28.

Referring to FIG. 2, the banknote acceptor includes a display panel 29 that includes a first display device 30 that displays an image 31 of the banknote under test derived from the pixelated data stored in memory 25 as a result of the banknote 2 passing through the sensing station S. The display panel 29 also includes a second display device 32, which may comprise one or more seven segment display units which display the denomination the banknote under test, which as will be explained hereinafter, is determined by comparing the pixelated data corresponding to the banknote with corresponding reference data held in memory 25 for acceptable banknotes of known, different denominations.

Display panel 29 also includes an actuator 33 in the form of an accept button that is depressible by the user to indicate acceptance of the banknote on the basis of the banknote image 31 and the corresponding denomination displayed on the display unit 32. A reject button 34 is provided on panel 29 to allow the user to reject the banknote under test. The display panel 29 further includes a button 35 which allows the user to retrieve images of previously accepted banknotes.

Thus, by successively actuating the button 35, successive images of previously accepted banknotes are displayed.

Figure 3:
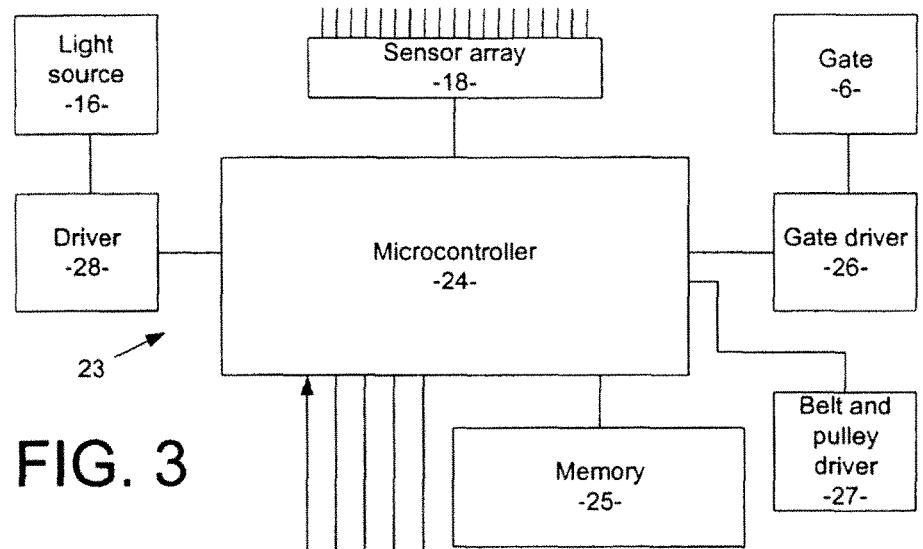
FIG. 3 is a schematic block diagram of the device shown in FIGS. 1 and 2.

As shown in FIG. 3, the displays 30, 32 are coupled to the micro controller 24 together with the accept, reject and retrieve buttons 33-35, to enable the micro controller 24 to control and coordinate the data displayed on the displays 30, 32 and acceptance of the banknote under test. In use, when the banknote 2 is inserted into the inlet 3 shown in FIGS. 1 and 2, it passes through the sensing station S and successive rows of pixelated image data are captured by a selected sensor array 18 and fed to the micro controller 24. The pixelated data is processed and compared with reference data corresponding to acceptable banknotes held in memory 25. If the banknote is found to be acceptable as a result of the comparison with the reference data, denomination data corresponding to the banknote denomination is displayed on the display 32 and an image of the banknote derived from the captured, pixelated, data is displayed on the display 30.

The user is thereby given an opportunity to review the banknote image 31 and its detected denomination indicated on display 32. If the displayed data is acceptable to the user, the accept button 33 is operated, in which case the micro controller 24 instructs the gate driver 26 shown in FIG. 3 to move the gate 6 to an acceptance position, and the belt driver 27 is operated to move the banknote along the accept path 7. However, if the user does not agree with either the displayed image or denomination on displays 30, 32, the reject button 34 can be operated, which correspondingly causes the banknote under test to be rejected, either by passing it to reject path 8 by appropriate operation of gate 5, or by reversing the note back out through the inlet 3.

Figure 4:
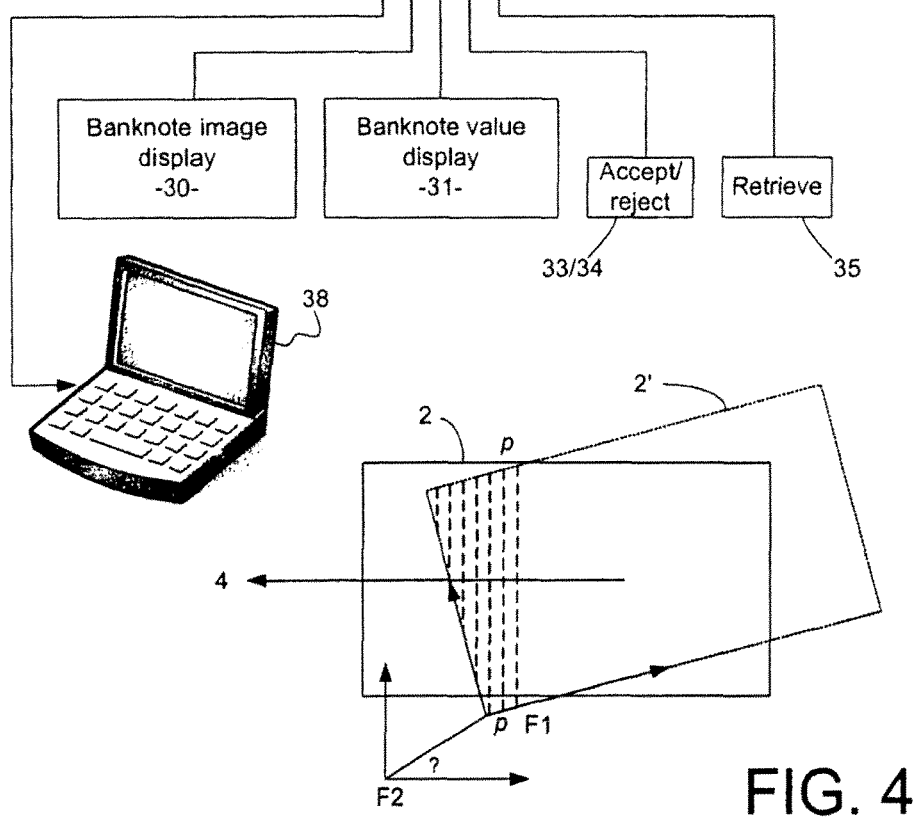
FIG. 4 is a schematic illustration of a banknote sampling frame FI for a banknote entering the acceptor at a skewed angle, and reference frame F2 for stored banknote reference data.

This process will now be described in more detail with reference to FIG. 5. At step S5.1, successive rows of image data are detected from the banknote under test at the sensing station S. Referring to FIGS. 1 and 4, the width of the path between the inlet 3 and outlet 5, is wider than some of the denominations of banknote to be tested, because different denominations of banknotes have different widths. As a result, the banknotes may not pass along the path 4 parallel to the side edges 12, 13 of the path through the acceptor 1. This is illustrated schematically in FIG. 4 in which banknote 2 is shown in solid outline is illustrated passing along the path in a direction of arrow 4, parallel to the side edges 11, 12 of the acceptor path. However, the banknote 2' is illustrated at a skewed angle [theta] to the direction of the path. Also, the banknote may not necessarily pass along the longitudinal centreline of the path depicted by arrow 4. Instead, it may be shifted to one side or the other depending on the manner in which the note 2 is inserted into the inlet by the user. Thus, for a banknote 2' depicted in dotted outline, successive rows of pixelated dataˆ developed by the detector 18-1 may be skewed relative to the side edges of the banknote. The pixelated data is thus developed in a banknote sampling frame FI with coordinate axis that are skewed relative to a reference frame F2 shown in FIG. 4. The stored reference data for acceptable banknotes held in memory 25 are held in the reference frame F2 whereas the captured pixelated data is in the banknote sampling frame FI, which may vary from banknote to banknote under test.

Figure 5:
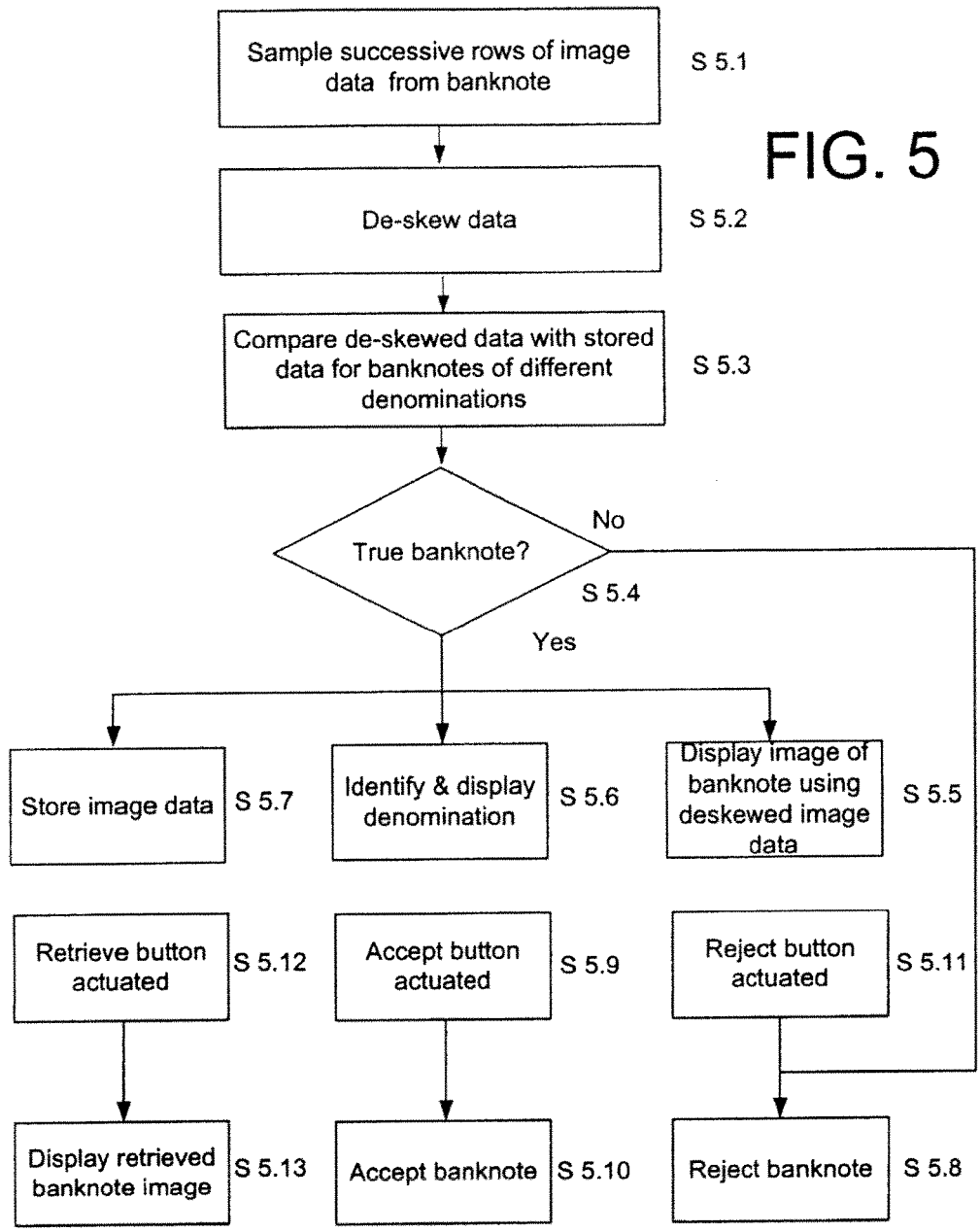
FIG. 5 is a flow diagram of processing steps performed by the microcontroller of the acceptor, for accepting or rejecting a banknote.

Referring to FIG. 5, at step S5.2, the micro controller 24 utilises a de-skewing algorithm to convert the sampled data for the banknote under test from the banknote sampling frame FI into the reference frame F2. This can be achieved in a number of different ways, for example by determining the edges of the banknote in the banknote sampling frame so as to compute the skewing angle [theta] and then transforming the data according to the angle. The microprocessor 24 may also compute the lengths of the side edges of the banknotes for comparison with the banknote reference data in order to assist in determining the banknote denomination.

At step 5.3, the resulting de-skewed data is compared with the stored data for banknotes of different denomination. This may involve a comparison of the length of side edges of the banknote and a comparison of regions bearing key visual features with corresponding stored data in the memory 25. If a true banknote is detected at step S 5.4, then at step S5.5 the de-skewed image data developed at step S5.2 is displayed as image 31 on the display device 30. Also, data corresponding to the denomination of the banknote determined at step S5.3 is displayed on the display device 32, at step S5.6. Also, at step S5.7, the image data that provides the banknote image display 31 is stored in memory 25 together with the data denoting the denomination displayed on display 32.

If the banknote is not accepted at step S5.4, the micro controller 24 causes it to be rejected at step S5.8, by appropriately instructing the gate driver 26 and belt driver 27, either to pass the banknote along reject path 8 or to reverse it back through the inlet 3.

However, for an acceptable banknote, the user that presented the banknote under test to the acceptor 1, is given an opportunity to review the outcome of the acceptance process before agreeing to acceptance of the banknote. Thus, the user can review the image 31 of the acceptable banknote together with its detected denomination as displayed on display 32 and decide whether it corresponds to the user's perception of the banknote and its denomination. Thus, in the example shown in FIG. 2, if the user considers that the banknote inserted through inlet 3 was a US$10 banknote, this would correspond to the displayed image 31 and the detected value shown on display 32, in which case, the user would operate the accept button 33. However, if the user believes that a US$50 banknote was presented to the acceptor 1, the user would not find the displayed image and denomination shown in FIG. 2 to be acceptable and would depress the reject button 34.

Referring to FIG. 5, if the accept button 33 is actuated, the micro controller 24 operates the gate driver 26 and belt driver 27 to drive the banknote along the accept path 7, to cause acceptance of the banknote as illustrated at step S5.10.

If the reject button is actuated as shown at step S5.1 I, the micro controller 24 operates the gate driver 26 and belt driver 27 to cause rejection of the banknote as previously described with reference to step S5.8. There may be situations where the user wishes to review the images of more than one inserted banknote, for example where more than one banknote is required to provide monetary credit for providing a purchase value greater than the individual, accepted banknotes. In this situation, the user can operate the retrieve button 35 as shown in FIGS. 2 and 3 and thereby cause a display of the images and denominations of previously inserted, acceptable banknotes. The micro controller 24 retrieves the image data for successive banknotes in response to successive operations of the retrieve button 35, and displays the data on the display devices 30, 32.

Figure 6:
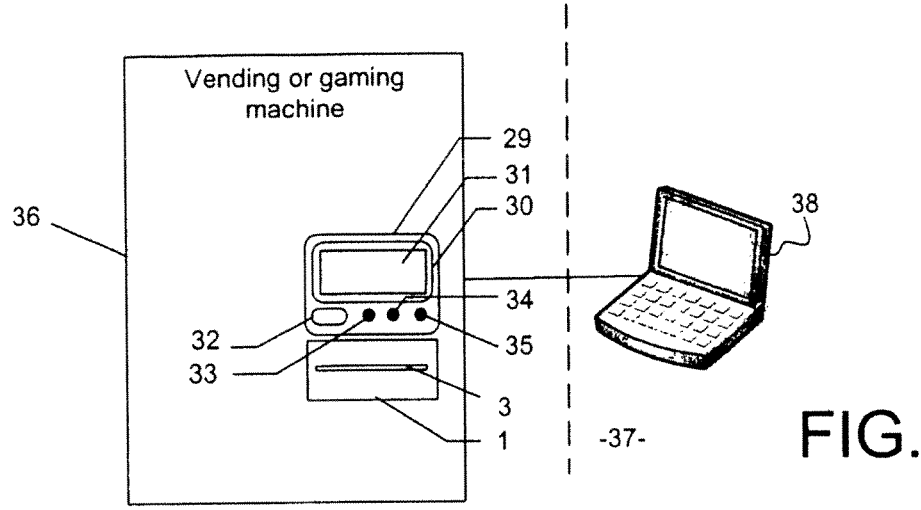
FIG. 6 is an illustration of a vending or gambling machine with a banknote acceptor according to the invention.

The acceptor according to the invention has particular application to so-called banknote-freed machines which are freed to operate in response to receiving an acceptable banknote of appropriate monetary value, such as vending and gaming machines. An example of a gaming or vending machine 36 is illustrated schematically in FIG. 6. Coin and banknote operated gaming machines and vending machines are well-known, and are provided with banknote acceptors to provide a user with credit based on an inserted banknote, for purchasing items or for allowing the user to play a game. The machine 36 illustrated in FIG. 6 is provided with a banknote acceptor 1 according to the invention with main body 9 and banknote inlet slot 3. The display panel 29 is also mounted on the machine 36 so that when the user inserts a banknote under test, the banknote acceptor either initially rejects the banknote or if it is found acceptable, an image of the banknote is displayed on display device 30 together with details of its denomination on display 32. The user can accept that the banknote is of the same denomination as the user's perception of it and operate accept button 33. Otherwise, reject button 34 can be operated and the banknote is returned to the user through the inlet slot as previously described. Thus, the user has no basis to object that the accepted banknote was of a higher denomination than the denomination attributed to it by the banknote acceptor 1.

Also, if more than one banknote is inserted for a particular purchase or to provide gaming credit, an image of each banknote can be displayed using the retrieve button 35, as previously described. This also reduces the scope for argument by the user concerning the amount of credit attributed by the banknote acceptor 1.

Figure 7:
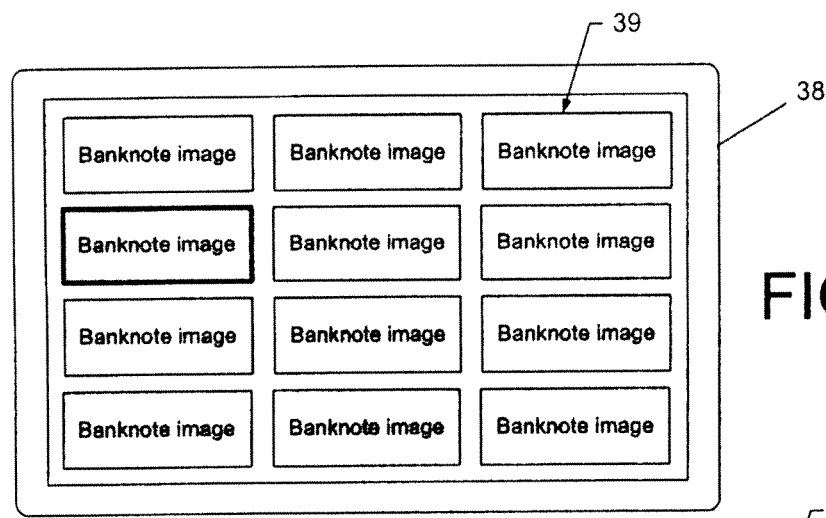
FIG. 7 is a view of a display provided by the device shown in FIG. 6.

The stored image data for acceptable banknotes can also be retrieved and displayed at a location that is remote from the vending or gaming machine. For example in a casino, the image data may be routed to a secure control room 37 to be displayed on a computer 38 as shown in FIG. 6. FIG. 7 illustrates a one possible display of banknote images corresponding to successive banknotes accepted by the banknote acceptor 1 shown in FIG. 6. Additionally, banknote denomination data for the acceptable banknotes may be displayed. The image illustrated in FIG. 7 can be used for statistical analysis of the performance of the banknote acceptor 1 and also by management personnel to assist in disputes about credit provided to users.

Figure 8:
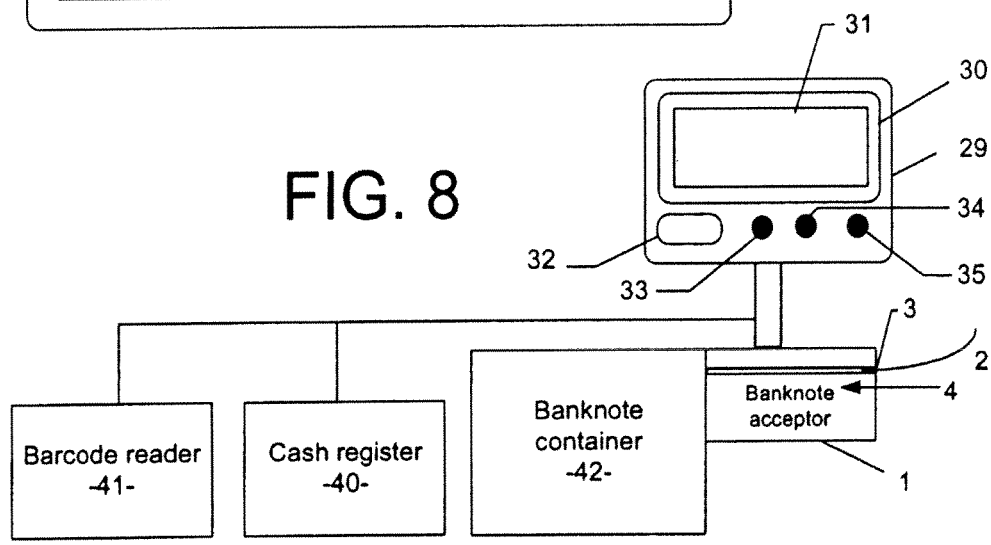
FIG. 8 is a block diagram of a point of sale device incorporating a banknote acceptor according to the invention.

The banknote acceptor according to the invention can also be used with advantage in point of sale devices, for example at the checkout in a supermarket. Referring to FIG. 8, the point of sale configuration for use at a supermarket checkout comprises a conventional cash register 40 with associated barcode reader 41 that reads barcodes on goods to be purchased. A note acceptor 1 according to the invention with an associated display panel 29 feeds acceptable banknotes received from customers into a note container 42, which may be periodically emptied or changed to allow banknotes to be transported to the checkout location an accounting office. The display panel 29 may be integrated into the usual display device of the cash register 40 which displays details of items purchased to the customer during the checkout process.

When a customer pays using one or more banknotes, the or each banknote is inserted into the inlet 3 to the banknote acceptor 1, and if acceptable, a corresponding display is provided on the display panel 29, comprising the image 31 of the detected banknote together with data corresponding to its denomination displayed on display device 32. If the customer accepts that the banknote has been accepted correctly by the banknote acceptor, based on the displayed information on panel 29, the customer operates accept button 33. Otherwise, reject button 34 is actuated and the banknote is rejected as previously described. Accepted banknotes are fed into the banknote container 40.

Many modifications of this arrangement are possible and for example, the image data for acceptable banknotes may be fed to a remote location corresponding to location 37 described in FIG. 6 e.g. an accounting office to provide statistical information concerning the banknote accepted by the banknotes acceptor 1.

Also, image data corresponding to the banknotes accepted and fed into the banknote container 40 may be stored for dispatch in a memory device associated with the banknote container or subsequent analysis at the time that the banknote container is opened, if required.

In another modification, the banknote container device 42 may be replaced by a packaging device in which banknotes are fed into a plastic container which has a lid sealed to it, such that the container cannot be subsequently reopened without destroying the container, in order to minimise pilfering.

The display devices 30, 32 shown in FIG. 6 may be integrated into display devices usually provided on gaming machines and some vending machines, to provide a display corresponding to the image of the banknote and its detected denomination. Similarly, the function of the accept, reject and retrieve buttons can be performed by making other features of the machine multi-functional to incorporate the afore-described functions. Also, whilst the image of the banknote is displayed using the image data that is used to authenticate the banknote, the displayed image can be produced by other means, such as a digital camera separate from the sensor array 18.

The invention claimed is:

1. A banknote acceptance apparatus for authenticating a banknote under test presented by a user, comprising:
   a sensing station to receive the banknote under test, including a detector to provide image signals corresponding to the banknote,
   a processor programmed to make a comparison of image data corresponding to at least some of the image signals from the detector, with stored reference data corresponding to an acceptable banknote, for determining the authenticity of the banknote under test, and to provide an acceptance signal for the banknote under test in dependence on the outcome of the comparison, and
   a display device operable to provide the user that presented the banknote with a display of a confirmatory visual image of the banknote under test, such as to allow the user to perform a visual check that the banknote detected at the sensing station corresponds to the banknote under test presented thereto by the user.

2. A banknote acceptance apparatus according to claim 1 wherein the detector is configured to provide said image signals in a banknote sampling frame and the processor is operable to provide the image data by de-skewing the image signals into a reference frame, for comparison with the stored reference data corresponding to an acceptable banknote.

3. A banknote acceptance apparatus according to claim 1 including
   a user operable device to signal acceptability to the user of the image of the banknote under test provided by the display device as corresponding to the banknote presented by the user, and
   a controller programmed to accept the banknote under test in dependence on said acceptance signal and the acceptability signaled by said user operable device.

4. A banknote acceptance apparatus according to claim 3 wherein the user operable device includes an accept button operable to signify that the display provided by the display device is acceptable to the user, and a reject button to signify that the display provided by the display device is not acceptable to the user.

5. A banknote acceptance apparatus according to claim 1 operable to authenticate banknotes of different denominations, wherein the processor is operable to compare the image data with stored reference data corresponding to acceptable banknotes of different denominations, such that the acceptance signal is indicative of the acceptability and the denomination of the banknote under test.

6. A banknote acceptance apparatus according to claim 1 wherein the display device is operable to display the denomination of the banknote as indicated by the acceptance signal.

7. A banknote acceptance apparatus according to claim 1 including a memory to store image data corresponding to successive banknotes presented to the sensing station, wherein the display device is operable to display the image signals from the memory.

8. A banknote operated machine that includes banknote acceptance apparatus according to claim 1.

9. A machine according to claim 8 wherein the display device is disposed remotely of the machine.

10. A point of sale device incorporating banknote acceptance apparatus according to claim 1.

11. A method of authenticating a banknote under test presented by a user, comprising:
providing image signals corresponding to the banknote,
comparing image data corresponding to at least some of the image signals, with stored reference data corresponding to an acceptable banknote, to determine the authenticity of the banknote under test,
providing an acceptance signal for the banknote under test in dependence on the outcome of the comparison, and
displaying to the user visual image signals for the banknote under test, such as to allow the user to perform a confirmatory visual check that the banknote detected at the sensing station corresponds to the banknote under test presented thereto by the user.

12. A method according to claim 11 including providing a display based on said image data to provide an image of the banknote under test.

13. A method according to claim 11 including providing said image signals in a banknote sampling frame and de-skewing the image signals into a reference frame, for comparison with the stored reference data corresponding to an acceptable banknote.

14. A method according to claim 11 including
actuating a user operable device to signal acceptability of the image of the banknote under test provided by the display device, and
accepting the banknote under test in dependence on said acceptance signal and the acceptability signaled by said user operable device.

15. A method according to claim 11 including comparing the image data with stored reference data corresponding to acceptable banknotes of different denominations, such that the acceptance signal is indicative of the acceptability and the denomination of the banknote under test.

16. Banknote acceptance apparatus for authenticating a banknote under test presented by a user, comprising:
a sensing station to receive the banknote under test, including a detector to provide image signals corresponding to the banknote,
a processor programmed to make a comparison of image data corresponding to at least some of the image signals from the detector, with stored reference data corresponding to an acceptable banknote, for determining the authenticity of the banknote under test, and to provide an acceptance signal for the banknote under test in dependence on the outcome of the comparison,
a display device operable to provide a display of a visual image of the banknote under test, such as to allow a visual check to be carried out to determine whether the banknote detected at the sensing station corresponds to the banknote under test presented thereto by the user, and
an image retrieval control operable to retrieve data corresponding to a banknote previously tested at the sensing station and to display a visual image thereof on the display device.

17. Banknote acceptance apparatus according to claim 16 wherein the image retrieval control is configured for use by a user of the acceptance apparatus.

18. Banknote acceptance apparatus according to claim 16 wherein the image retrieval control is configured for use by an operator of the apparatus.

19. Banknote acceptance apparatus according to claim 16 wherein the image retrieval control is operable to display visual images of a plurality of previously tested banknotes.

20. Banknote acceptance apparatus for authenticating a banknote under test presented by a user, comprising:
a sensing station to receive the banknote under test, including a detector to provide image signals corresponding to the banknote,
a processor programmed to make a comparison of image data corresponding to at least some of the image signals from the detector, with stored reference data corresponding to an acceptable banknote, to determine the authenticity and denomination of the banknote under test, and to provide an acceptance signal for the banknote under test in dependence on the outcome of the comparison,
a display device operable to provide the user that presented the banknote with a display of the denomination of the banknote under test, such as to allow the user to perform a visual check that the banknote detected at the sensing station corresponds to the banknote under test presented thereto by the user
a user operable device to signal acceptability to the user of denomination of the banknote under test provided by the display device corresponds to the banknote presented by the user, and
a controller programmed to accept the banknote under test in dependence on said acceptance signal and the acceptability of the denomination signaled by said user operable device.

21. Banknote acceptance apparatus according to claim 20 wherein the user operable device includes an accept button operable to signify that the display provided by the display device is acceptable to the user, and a reject button to signify that the display provided by the display device is not acceptable to the user.

22. Banknote acceptance apparatus according to claim 20 wherein the detector is configured to provide said image signals in a banknote sampling frame and the processor is operable to provide the image data by de-skewing the image signals into a reference frame, for comparison with the stored reference data corresponding to an acceptable banknote.

23. A method of authenticating a banknote under test presented by a user, comprising:
providing image signals corresponding to the banknote, comparing image data corresponding to at least some of the image signals, with stored reference data corresponding to an acceptable banknote, to determine the authenticity and denomination of the banknote under test, providing an acceptance signal for the banknote under test in dependence on the outcome of the comparison, displaying to the user visual data corresponding to the denomination of the banknote under test, such as to allow the user to perform a visual check that the banknote detected at the sensing station corresponds to the banknote under test presented thereto by the user, actuating a user operable device to signal acceptability of the denomination of the banknote under test displayed by the display device, and accepting the banknote under test in dependence on said acceptance signal and the acceptability of the denomination signaled by said user operable device.

24. Banknote acceptance apparatus for authenticating a banknote under test presented thereto by a user, comprising:
a sensing station to receive the banknote under test, including a detector to provide image signals corresponding to the banknote,
a memory to store reference data corresponding to an acceptable banknote
a processor to make a comparison of image data corresponding to at least some of the image signals from the detector with the stored reference data corresponding to an acceptable banknote, for determining the authenticity of the banknote under test, and to provide an acceptance signal for the banknote under test in dependence on the outcome of the comparison,
a display device operable to provide a confirmatory, non covert visual display of signals for the banknote under test to allow the user to perform a visual check that the banknote detected at the sensing station corresponds to the banknote under test presented thereto by the user,
a user operable device to signal acceptability of the image of the banknote under test provided by the display device for the visual check, and
control means to accept the banknote under test in dependence on said acceptance signal and the acceptability signaled by said user operable device.

25. Apparatus according to claim 24 wherein the display device includes an image display panel operable to provide a display based on said image data to provide a visual image of the banknote under test.

26. Apparatus according to claim 24 wherein the display device includes a display unit operable to display the denomination of banknote under test.

27. Apparatus according to claim 1 wherein the display device is operable to provide the user that presented the banknote with a non covert display of a confirmatory visual image of the banknote under test.

* * * * *